(12) United States Patent
Mahdian et al.

(10) Patent No.: US 8,069,083 B2
(45) Date of Patent: Nov. 29, 2011

(54) PAY-PER-ACTION SYSTEM FOR SELLING ADVERTISEMENTS

(75) Inventors: Mohammad Mahdian, Santa Clara, CA (US); Kerem Tomak, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1090 days.

(21) Appl. No.: 11/835,733

(22) Filed: Aug. 8, 2007

(65) Prior Publication Data
US 2009/0043648 A1 Feb. 12, 2009

(51) Int. Cl.
*G06Q 30/00* (2006.01)
(52) U.S. Cl. .............. 705/14.7; 705/14.69; 705/14.46; 705/14.71; 705/14.55; 705/37
(58) Field of Classification Search ............ 705/14
See application file for complete search history.

(56) References Cited

U.S. PATENT DOCUMENTS

| | | | |
|---|---|---|---|
| 6,009,409 A | 12/1999 | Adler et al. | |
| 6,026,368 A | 2/2000 | Brown et al. | |
| 6,401,075 B1 | 6/2002 | Mason et al. | |
| 6,714,975 B1 | 3/2004 | Aggarwal et al. | |
| 6,826,572 B2 | 11/2004 | Colace et al. | |
| 6,907,566 B1 | 6/2005 | McElfresh et al. | |
| 7,035,812 B2 | 4/2006 | Meisel et al. | |
| 7,043,483 B2 | 5/2006 | Colace et al. | |
| 7,089,195 B2* | 8/2006 | Rosenberg | 705/14.69 |
| 2003/0046161 A1 | 3/2003 | Kamanger et al. | |
| 2003/0149938 A1 | 8/2003 | McElfresh et al. | |
| 2004/0093327 A1 | 5/2004 | Anderson et al. | |
| 2004/0186776 A1 | 9/2004 | Llach | |
| 2005/0010477 A1 | 1/2005 | Sullivan et al. | |
| 2005/0154746 A1 | 7/2005 | Liu et al. | |
| 2005/0251444 A1* | 11/2005 | Varian et al. | 705/14 |

OTHER PUBLICATIONS

Larson, Roland; Kanold, Timothy; Stiff, Lee; Algebra 1, Authentic Algebra for All Students by an Experienced Author Team, "2.3 Subtraction of Real Numbers," pp. 75, D.C. Heath and Company, 1993.*
Press Release article titled "Forrester Research Releases US Online Advertising and Marketing Forecast—Market to Reach $26 Billion by 2010", Business Wire, dated May 3, 2005, obtained from the internet at, <http://findarticles.com/p/articles/mi_m0EIN/is_2005_May_3> on Aug. 10, 2007.

* cited by examiner

*Primary Examiner* — Nathan C Uber
(74) *Attorney, Agent, or Firm* — Brinks Hofer Gilson & Lione

(57) ABSTRACT

A system is disclosed for a pay-per-action (PPA) advertising model. An advertiser reports actions and pays an advertising provider for each action that is reported. The payment may be based on the rate at which the actions are reported. The action rate may be updated based on each reported action, which may modify the payment for that action and may modify the payment for previous actions. A one-time premium may be charged to advertisers and a minimum action rate may be established to encourage advertisers to accurately report actions.

6 Claims, 4 Drawing Sheets

PAY-PER-ACTION SYSTEM FOR SELLING ADVERTISEMENTS

BACKGROUND

Online advertising may be an important source of revenue for enterprises engaged in electronic commerce. A number of different types of web page based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a web page to be configured to contain a location for inclusion of an advertisement. A page may not only be a web page, but any other electronically created page or document.

The online advertising industry utilizes a pay-per-impression model and a pay-per-click model. An impression is a display of an advertisement to a user. In general, an advertiser is willing to pay for impressions if the aim of the advertising campaign is to increase brand awareness. However, with the growth of sponsored searching, it has been more common to utilize the pay-per-click model as it decreases the risk to small advertisers. An advertiser is more inclined to pay for click-throughs if the goal is to generate traffic which in turn increases the probability of a sale. An advertiser is not assured that each recorded impression results in a user actually viewing the advertisement on the page; however, a click on that advertisement confirms that the advertisement was acknowledged. In the former case, advertisers pay per impression (PPM) while in the latter case they pay per click (PPC). The PPC model also may include a rank-by-revenue mechanism in which ads are sorted by their pay per click multiplied by the measured or estimated click-through-rate (CTR).

However, the PPC model may be subject to a click fraud problem. Click fraud can take place, for example, if an advertiser's employees repeatedly click on a competitor's advertisement link in an attempt to drain the competitor's marketing budget. Also, rogue web site owners who advertise with an advertising provider (such as Yahoo! ® or Google®) may maliciously click on their own advertisement links to generate more commissions from that advertisement.

An alternative model is pay-per-conversion or pay-per-action (PPA). The PPA model links payments to actions (such as sales/phone calls/online orders/etc.). An advertiser states his/her willingness to pay for an "action," which may be any action beyond a click-through. The pay-per-impression and pay-per-click models allow the advertiser provider to record impressions or clicks and request payment based on that measurement. However, a conversion or action in the pay-per-action model is recorded by the advertiser and reported to the advertising provider. Accordingly, the advertising provider must rely on accurate reporting by the advertiser of conversions or actions to charge the advertiser. Therefore, there is a need for an accurate and fair PPA model for reporting actions that result from online advertising.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

By way of introduction, the embodiments described below include a system and method for advertising. The embodiments relate to a pay-per-action (PPA) advertising model. An action is anything beyond a click of an advertisement (such as a purchase or filling out a form) that results from an impression of that advertisement. An impression may be any viewing of an advertisement by a user or consumer. An advertiser reports the actions and pays the advertising provider for each action. The payment is based at least in part on the rate at which the actions are reported. The action rate may be the number of actions reported per impression. The action rate may be updated based on each reported action, which may modify the payment for that action and may modify the payment for previous actions. A one-time premium may be charged to advertisers and a minimum action rate may be established to encourage advertisers to accurately report the actions.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments.

Figure 1:
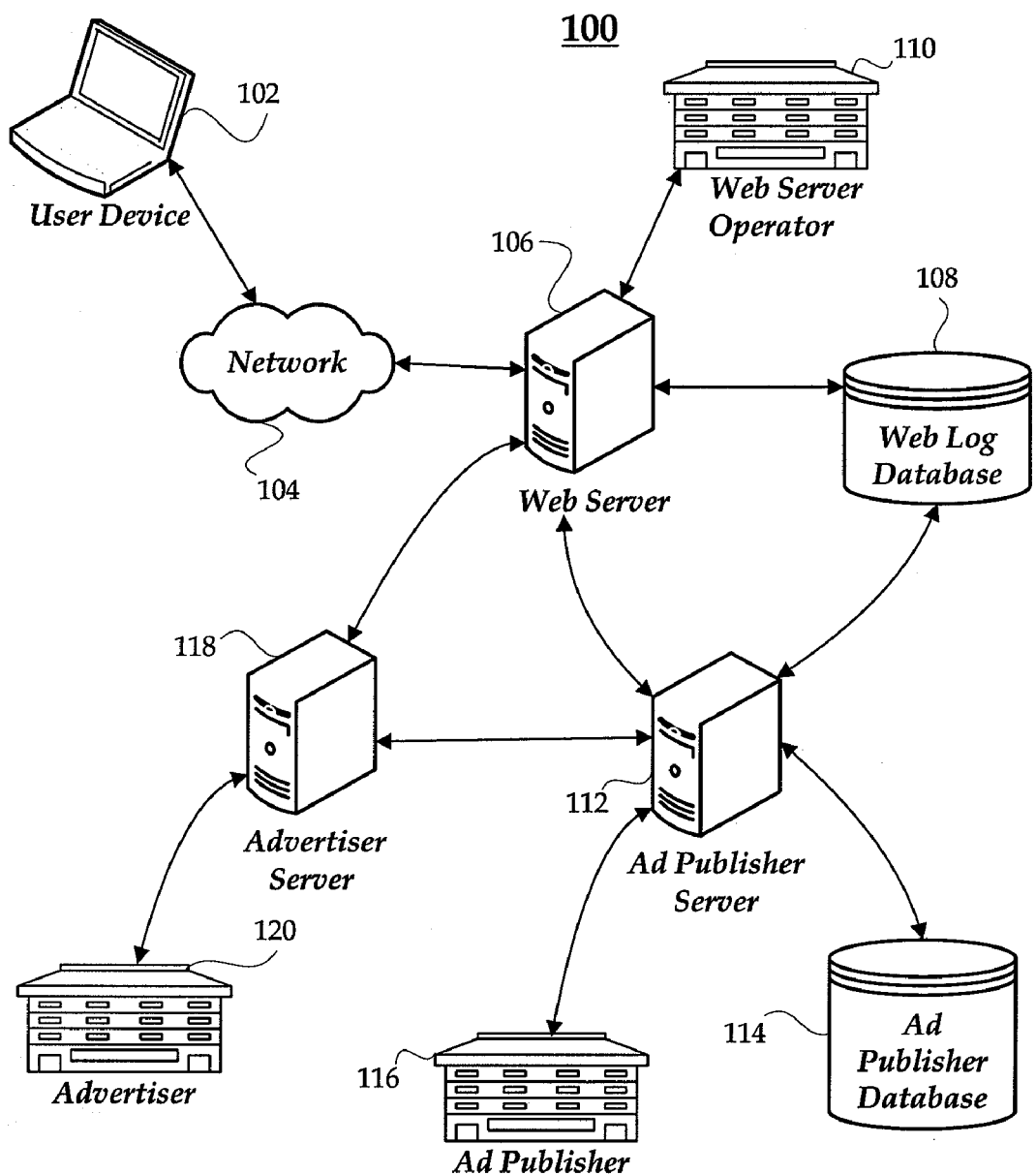
FIG. 1 illustrates an embodiment of an advertising system.

FIG. 1 depicts a block diagram illustrating one embodiment of an exemplary advertising system 100. The advertising system 100 may provide a platform for the bidding, selection and payment of advertisements included in pages, such as web pages. In the advertising system 100, a user device 102 is coupled with a web server 106 through a network 104. A web server operator 110 may be coupled with the web server 106. The web server 106 is coupled with a web log database 108, and both are coupled with an ad publisher server 112. An advertiser 120 coupled with an advertiser server 118 may be coupled with the ad publisher server 112 and/or the web server 106. An ad publisher 116 and ad publisher database 114 may be coupled with the ad publisher server 112. Herein, the phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The user device 102 may be a computing device which allows a user to connect to a network 104, such as the Internet. Examples of a user device include, but are not limited to, a personal computer, personal digital assistant ("PDA"), cellular phone, or other electronic device. The user device 102 may be configured to allow a user to interact with the web server 106 or other components of the advertising system 100. The user device 102 may include a keyboard, keypad or a cursor control device, such as a mouse, or a joystick, touch screen display, remote control or any other device operative to allow a user to interact with the web server 106 via the user device 102. In one embodiment, the user device 102 is configured to request and receive information from the web server 106, such as a web page.

The user device 102 may be configured to access other data/information in addition to web pages over the network 104 using a web browser, such as INTERNET EXPLORER® (sold by Microsoft Corp., Redmond, Wash.). The data displayed by the browser may include advertisements. In an alternative embodiment, software programs other than web browsers may also display advertisements received over the network 104 or from a different source. The user device 102 may be implemented as in the computer system described below with respect to FIG. 4.

In one embodiment, the web server 106 provides an interface to a network 104 and/or provides a web page to the user device 102. The web server 106 may provide the user device 102 with pages (including advertisements) that are requested by a user of the user device 102. In particular, the web server 106 may act as an interface to a larger network, such as the Internet and/or the network 104, by providing a portal for a user of the user device 102. The web server 106 may be a content provider for the user device 102 that provides content from another source, such as other web servers in a network. The web server 106 may be operated by a web server operator 110 that maintains and oversees the operation of the web server 106.

In one embodiment, the web server 106 may be a search engine for searching for pages, such as the web page which may be accessed on the World Wide Web at yahoo.com (operated by Yahoo! Inc., in Sunnyvale, Calif.), which is used to search for pages in a network. The user may enter a search term (also referred to as a query or a keyword) into the user device 102 that is transmitted to the web server 106. The web server 106 performs a search on the search query and provides the results of the search for display on the user device 102. The web server 106 may also display advertisements that are related to the search term and/or the search results and that are provided by the ad publisher server 112 as discussed below.

The web server 106 may include or be coupled with a web log database 108. The web log database 108 may include records or logs of at least a subset of the queries or requests for data submitted to the web server 106 over a period of time. In one example, the web log database 108 may include a history of search terms or Internet browsing data. The data stored in the web log database 108 may relate to or include various user information, such as preferences, interests, profile information or browsing tendencies, and may include the number of impressions and/or number of clicks on particular advertisements.

The ad publisher server 112 may be coupled with the web server 106 and is configured to provide advertisements to be displayed on the user device 102 with the content provided by the web server 106. In one embodiment, the ad publisher server 112 may be a web server, such as the web server 106. In other words, the user device 102 may receive content directly from the ad publisher server 112 over the network 104.

The ad publisher 116 may be coupled with the ad publisher server 112 and/or coupled with the web server 106 for providing the ad publisher's advertisements for display. The ad publisher 116 may operate or oversee the ad publisher server 112 by receiving advertisements from the advertiser server 118 and selecting advertisements for display on pages. In addition, the ad publisher may record the impressions and clicks related to a displayed advertisement. The ad publisher 116 may be any operator of a page displaying advertisements that receives a payment from the advertisers of those advertisements. For example, Yahoo!® may be an ad publisher 116 because its search engine (www.yahoo.com) and related Yahoo!® web pages display advertisements for advertisers, such as the advertiser 120. The ad publisher 116 may be an advertisement provider who provides advertisements for other pages. For example, Yahoo! Content Match® provides advertisements (from third-party advertisers) to any other site for display on that site. The advertiser may pay Yahoo! Content Match® and/or the site for the display of the advertiser's advertisements.

The ad publisher database 114 may be coupled with the ad publisher server 112 and may store advertisements from a number of advertisers, such as the advertiser 120. In addition, the ad publisher database 114 may store records on the advertisements that are shown and the resulting impressions and/or clicks for those advertisements. The data related to advertisement impressions, clicks and resulting actions may be stored in either the web log database 108 and/or the ad publisher database 114 and used in the bidding and payment process for selecting and receiving payments for advertisements, as discussed below. The data may be continuously updated to reflect current viewing, clicking and interaction with the advertisements provided by the ad publisher 116.

The ad publisher server 112 may receive advertisements from a number of advertisers, such as the advertiser 120. In particular, the ad publisher server 112 may be coupled with the advertiser server 118. The advertiser server 118 may be an interface for the advertiser 120 to provide advertisements to the ad publisher server 112. The advertiser 120 and the ad publisher 116 may utilize the payment process discussed below, in which the advertiser 120 pays the ad publisher 116 a price for actions performed based on the advertisements of advertiser 120 being displayed by the ad publisher 116.

The advertiser 120 may pay the ad publisher 116 for each impression and/or each click of the advertiser's displayed advertisement. Additionally, the advertiser 120 may pay the ad publisher 116 each time its displayed advertisement results in an action. The ad publisher 116 may select which advertisement is displayed in each advertisement slot based on a bidding process. For example, the ad publisher 116 may select the advertisement with the highest or most relevant bid. A relevant bid may be established by matching the content of a page with content of the advertisement, such as with Yahoo! Content Match®. Depending on the payment scheme, the advertiser 120 may pay the ad publisher 116 each time the advertisement is viewed (PPM), clicked (PPC), and/or results in an action (PPA).

In one exemplary embodiment, when a user requests content through the user device 102, the request is submitted to the web server 106 over the network 104. The web server 106 retrieves the requested content and contacts the ad publisher server 112 to receive at least one advertisement to be displayed with the content. The ad publisher 116 may review the advertisements that are available in the ad publisher database 114. The advertisement that is shown with the content may advertise a product from the advertiser 120. The content with the advertisement may then be transmitted to the user device 102, and the user views the content along with the advertisement.

Any of the components in the advertising system 100 may be coupled with one another through a network, including but not limited to the network 104. For example, the ad publisher server 112 may be coupled with the web server 106 or the web log database 108 over a network. Likewise, the advertiser server 118 may be coupled with the web server 106 and/or the ad publisher server 112 over a network. Accordingly, any of the components in the advertising system 100 may include communication ports configured to connect with a network.

The network or networks that may connect any of the components in the advertising system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. For example, the ad publisher server 112 or the web server 106 may provide advertisements and/or content to the user device 102 over a network, such as the network 104. The network or networks described above, including the network 104 may be implemented with computer systems, such as the computer system discussed below with respect to FIG. 4.

The web server 106, the web log database 108, the ad publisher server 112, the advertiser server 118, the ad publisher database 114, the user device 102, the web server operator 110, the ad publisher 116, and/or the advertiser 120 may represent computing devices of various kinds, such as the computer system or its components described below with respect to FIG. 4. Such computing devices may generally include any device that is configured to perform computation and that is capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the user device 102 may be configured to execute a browser application that employs HTTP to request information, such as a web page, from the web server 106. The present disclosure contemplates the use of a computer-readable medium that includes instructions or receives and executes instructions responsive to a propagated signal, so that any device connected to a network can communicate voice, video, audio, images or any other data over a network.

Figure 2:
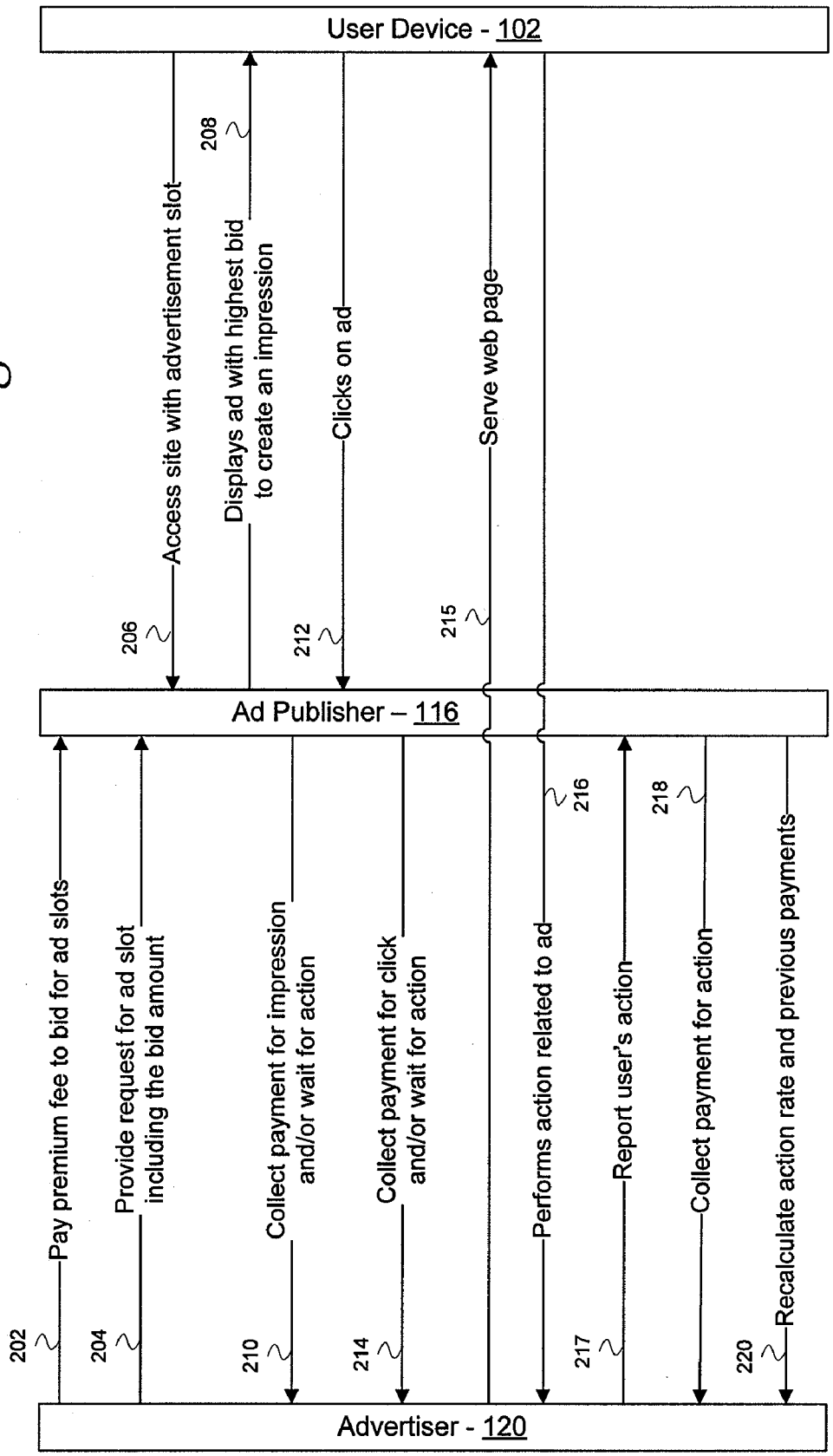
FIG. 2 is a diagram of an exemplary advertising payment system.

FIG. 2 illustrates a timing diagram of an exemplary pay-per-action (PPA) model. The pay-per-action model discussed in FIG. 2 includes a process by which an advertiser may bid for an advertisement slot and pay for an impression, click, and/or action that results from that advertisement. In one embodiment, the model illustrated in FIG. 2 may be performed by or within the advertising system 100. The advertiser 120 may place a bid for a particular advertisement slot in a page provided by the ad publisher server 112. The ad publisher 116 may select the advertisement from the advertiser 120 who places the highest or relevant bid.

The PPA model may include bidding and payment based on impressions, clicks and/or actions. For example, the advertiser 120 may place a bid that is based on an amount that the advertiser will pay for each impression. The advertiser 120 may pay $0.01 for every impression of the advertisement. If the advertisement is viewed 10,000 times, then under a pay-per-impression (PPM) model, the advertiser 120 pays the ad publisher $100. The PPM model may be used for advertisers, such as brand advertisers, who seek attention from consumers. Likewise, in the pay-per-click (PPC) model an advertiser 120 places a bid which represents a price that the advertiser 120 will pay for each click or interaction with the advertisement. For example, the advertiser 120 may pay $1.00 for each click of an advertisement.

The pay-per-action (PPA) model may be utilized such that the advertiser 120 bids for and pays for a conversion or action after a click-through resulting from the display of the advertiser's 120 advertisement. A conversion or action may be any act that directly results in revenue. For example, one type of action may be buying a product from the advertiser's 120 web site. If a consumer clicks on an advertisement and subsequently purchases a product from that site, the advertiser 120 pays the ad publisher 116 for the action. There may be other types of actions, depending on the type of the advertiser. For example, for an ad portal, a click on one of the ads listed on the page may be considered an action as it brings immediate revenue. Alternatively, the action may not bring in revenue, but may result in additional customers. For example, an action may include filling out an application (e.g., credit card, or other account application), calling a phone number, or signing up for a service, such as a social networking or media download site. Certain advertisers may advertise to seek attention, such as big brands (e.g., auto manufacturers) and consequently may prefer PPM. Conversely, other advertisers may seek actions from its advertisements (e.g., small online shops).

In the PPA model of advertising, the advertiser 120 can make payments contingent on impressions and click-throughs as well as actions. For example, the advertiser can offer to pay 0.1 cents for every impression of its advertisement, 10 cents every time its ad is clicked on, plus $40 every time an action is taken, such as the user filling out a credit card application on the web site. The auction mechanism by the ad publisher 116 extracts all such bids from the advertisers and decides which advertisements to deliver based on the bids. The ad publisher 116 also determines how much each advertiser should be charged, depending on whether the ad is displayed, clicked on, and/or whether the advertiser 120 reports that the advertisement has resulted in an action. In one embodiment, the bids from the advertisers 120 are ranked based on their bid per impression, plus their bid per click times their click-through rate (CTR), plus their bid per action times their action rate (AR). The calculation and modification/adjustment to the action rate is discussed below.

Referring to FIG. 2, in step 202 the advertiser may pay a premium fee before bidding for advertisement slots available on a page from the ad publisher 116. The advertiser may be charged an initial fixed premium for entering the system (submitting its first advertisement to the ad publisher 116) and providing advertisements for display. In one embodiment, the PPA model may be structured to avoid prevent advertisers from not reporting actions to avoid paying the fee for the action to the ad publisher 116. The premium fee may be one way to prevent advertisers from submitting advertisements and then removing them without reporting or paying for any actions. A second protection may be a minimum action rate (AR) requirement for advertisers to further ensure that advertisers are reporting any actions they receive. As discussed below, the action rate is the number of actions per impression for a particular advertisement. If an advertiser does not report actions at a rate above the minimum action rate, then that advertiser's advertisements may be removed. In addition, the payment for each action may be at least partially based on the action rate, so that advertisers that potentially under-report actions may have to pay a larger amount for each action. Further, an advertiser's subsequent bids may be at least partially based on that advertiser's action rate, so under-reporting actions may result in fewer available advertisements for that advertiser.

The advertiser 120 reports when an action occurs. Since the advertiser 120 pays the ad publisher 116 for each reported action, the advertiser 120 may avoid payment by not reporting all actions. The premium and minimum action rate may be established to discourage non-reporting of actions by the advertisers. The premium may be a small, one-time fee, so it does not affect honest advertisers who do not attempt to take advantage of the system. In one embodiment, all or part of the premium may be refunded to the advertiser upon deciding to no longer advertise with the ad publisher 116, depending on the advertiser's action rate upon leaving. For example, an advertiser may pay a $100 premium and upon no longer advertising with the advertiser publisher 116 is awarded back a percentage of the $100. If the action rate is below the minimum action rate, then none of the premium is refunded. The refund amount may depend on the learning algorithm used, and/or the action rate of the advertiser upon leaving. For example, if the action rate of the advertiser at the time of leaving is larger than the action rate initially assigned to the advertiser (upon submitting the first advertisement), then the premium may be refunded. In one embodiment, the premium can be thought of as the fee for buying an initial high action rate. A first time advertiser may start with a standard action rate (above the minimum rate) that establishes the bid amount and payment amount for an action. The action rate will be modified as impressions are recorded and actions are reported.

The value of the premium fee may depend on the threshold for the minimum action rate, an action-rate learning algorithm (which determines the action rate and refines it based on new data), and/or the initialization of the action rate when an advertising campaign starts. The paper "Click Fraud Resistant Methods for Learning Click-Through Rates" by Nicole Immorlica et al., published by Microsoft Research, which is hereby incorporated by reference, illustrates examples of action based learning algorithms, which may correspond with click-based learning algorithms.

Action based learning algorithms may be used to calculate the "expected" revenue from an auction. Since an action is a future event with a probability of occurrence, the auction mechanism may estimate the future actions based on past action behavior. In one embodiment, when the action-rate learning algorithm estimates the action rate by the average over the last k actions (i.e., AR is equal to k divided by the number of impressions it took to get the last k actions), the amount of premium may be calculated to be $kp(1/\delta - 1)$, where p is the reserve price for a bid or the next highest bid (discussed below), and $\delta$ is the threshold for minimum allowable action rate. The minimum allowable action rate may be established by the ad publisher 116 to discourage under-reporting of action from the advertiser 120. Accordingly, the amount of the premium increases if the threshold is decreased, or if the value of k increases, which may correspond to increasing the accuracy of the learning algorithm. In addition, the lower the minimum action rate $\delta$ is, the higher the premium may be. If the minimum action rate $\delta$ is high, then the premium may be relatively low.

In step 204, the advertiser 120 may provide a request to the ad publisher 116 for an advertisement. The request may include the advertiser's 120 bid for a particular advertisement slot. As discussed above, the bid may include a price for each impression, click and/or action. In one embodiment, the bid per action is $b_a$, AR is the estimated action rate for this advertiser 120, and p is the price-per impression of the ad slot. The value p is the amount that must be bid to get a particular slot, such as a reserve price, or the bid of the next advertiser. When only bidding for an action, the advertisement may be displayed when $b_a \times AR \geq p$. The advertiser may be charged an amount equal to p/AR per action. However, the advertiser 120 may specify a bid per impression $b_m$, a bid per click $b_c$, and/or a bid per action $b_a$. In one embodiment, the advertisement may be displayed when $b_m + b_c \times CTR + b_a \times AR \geq p$. The bidding scheme may be modified to yield an expected price per impression of p. For example, an advertiser 120 may modify its bids per impression, click and actions to make the expected payment equal to a certain value of p. In an alternative embodiment, the advertiser 120 may submit different bids for different types of actions. For example, one action may be a customer creating a log-in for a site, which may have a smaller bid than an action of making a product sale.

The ad publisher 116 may select the advertisement with the highest or most relevant bid to be displayed. The ad publisher server 112 may include the advertisement with a page displayed by the web server 106 to the user device 102. A consumer or user may view the page with the displayed advertisement on the user device 102. In step 206, the user device 102 accesses the site with the advertisement to be displayed on the user device 102. The ad publisher 116 through the ad publisher server 112 and/or the web server 106 provides the page with the advertisement for viewing on the user device 102 as in step 208. This results in an ad impression for the advertisement displayed on the page. In step 210, a payment from the advertiser 116 may be calculated and/or collected by the ad publisher 116 if the advertiser's bid was based on payment per impression. The payment may be based on the number of impressions recorded multiplied by the bid per impression. Alternatively, the payment from the advertiser 120 may be calculated and/or collected at a set time interval, such as by monthly bills from the ad publisher 116. For example, at the end of the month, the ad publisher 116 will send a bill to the advertiser 120 for that month's impressions.

The user may click on the advertisement in step 212, resulting in a click-through. In step 214, a payment from the advertiser 116 may be calculated and/or collected by the ad publisher 116. The payment may be based on the recorded click-through rate multiplied by the bid per click. This is a payment for a PPC model. A PPA model may still provide payments for click-throughs, but the bid may reflect different amounts for impressions, clicks and/or actions. In the PPA model, payments for each of impressions, clicks and/or actions may be combined into one payment or may be paid together as a single payment. Alternatively, the ad publisher 116 may calculate and/or bill the advertiser 120 periodically, such as monthly, rather than collecting payments for each impression, click and/or action.

The result of the click in step 212 may be displaying the advertiser's web page on the user device 102. In step 215, the advertiser 120 serves its web page or a page related to its advertisement to the user device 102. In particular, the advertiser server 118 and/or the web server 106 may provide the advertiser's 120 page to the user device 102. As a result of the click-through, the user may leave the domain of the publisher and enter the advertiser's web site. It is on the advertiser's 120 page that the user may perform an action as described above. For example, in his/her interaction with this web site, the user might perform certain actions such as filling out a form, signing up at the web site, calling a phone number listed on the web site, or purchasing merchandise listed on the web site as in step 216. The action may take place outside the scope of control of the ad publisher 116. In particular, the ad publisher 116 may rely on the advertiser to report the actions that take place (perhaps through an automatic software agent supplied by the ad publisher 116) as in step 217. The action may occur on the web page served by the advertiser 120 in step 215, so the advertiser 120 detects and reports that action to the ad publisher 116 in step 217. Conversely, impressions and click-throughs may be recorded by the ad publisher 116.

The detection of the action in step 216 may vary based on the type of action. An action such as buying a product or service may take place days or even weeks after the initial impression for the advertisement. Accordingly, the linking of an action with a particular advertisement impression may be affected by the timing difference of when the advertisement was shown (impression) and when the user performed the action. In one embodiment, post-purchase surveys, or the use of cookie technology may be used to identify the source or cause of the action. Alternatively, tracking software may be used to identify when an impression eventually leads to an action. The tracking software may identify the original impression that introduced the user to the advertiser 120. For example, a user may see an advertisement from the advertiser 120 and click on that advertisement, which displays the website of the advertiser 120 to the user. This first visit may be recorded in cache or through tracking software. If the user later purchases a product or performs another action on the advertiser's 120 website then, the stored information identifies the initial impression that led to the action.

The performing of an action by the user in step 216 may be used to calculate the payment for the action in step 218. In one embodiment, an advertiser 120 may specify a bid $b_m$ for impressions and a bid $b_a$ for actions. The ad publisher 116 may award the advertisement slot to the advertiser 120 when $b_m + AR \times b_a \geq p$, where AR is the current estimate of the action rate. As discussed above, the first time the advertiser 120 places a bid, there is an initial premium fee, which is paid that establishes an initial estimated AR for the advertiser 120. Subsequently, the AR is determined based on the reported actions from the advertiser 120 as discussed below in step 220.

In one embodiment, the advertiser 120 may be charged pm for each impression and pa for each action, where $p_m = \min(b_m, p)$ and $p_a = (p - p_m)/AR$.

The payment for each impression is the minimum value of the bid for the impression bm, or the reserve price per impression p. The payment per impression is the bid for the impression bm, unless the bid for the impression bm is less than the reserve price per impression p. If the advertiser's bid per impression is enough to win the auction for an ad slot, then the advertiser may not be charged an additional amount for actions. In other words, pa=0 when bm=p, because pm=bm =p. As discussed above, the value p is a minimum amount the advertiser needs to bid to win the slot. This may be the reserve price in the auction, or a next highest bid. For example, in an auction with no reserve price, p may be the maximum bid of competing bidders, such that if an advertiser wants to win the slot, he/she needs to bid at least an amount p. The action rate may be estimated as one divided by the number of impressions since the last impression that lead to an action.

Figure 3:
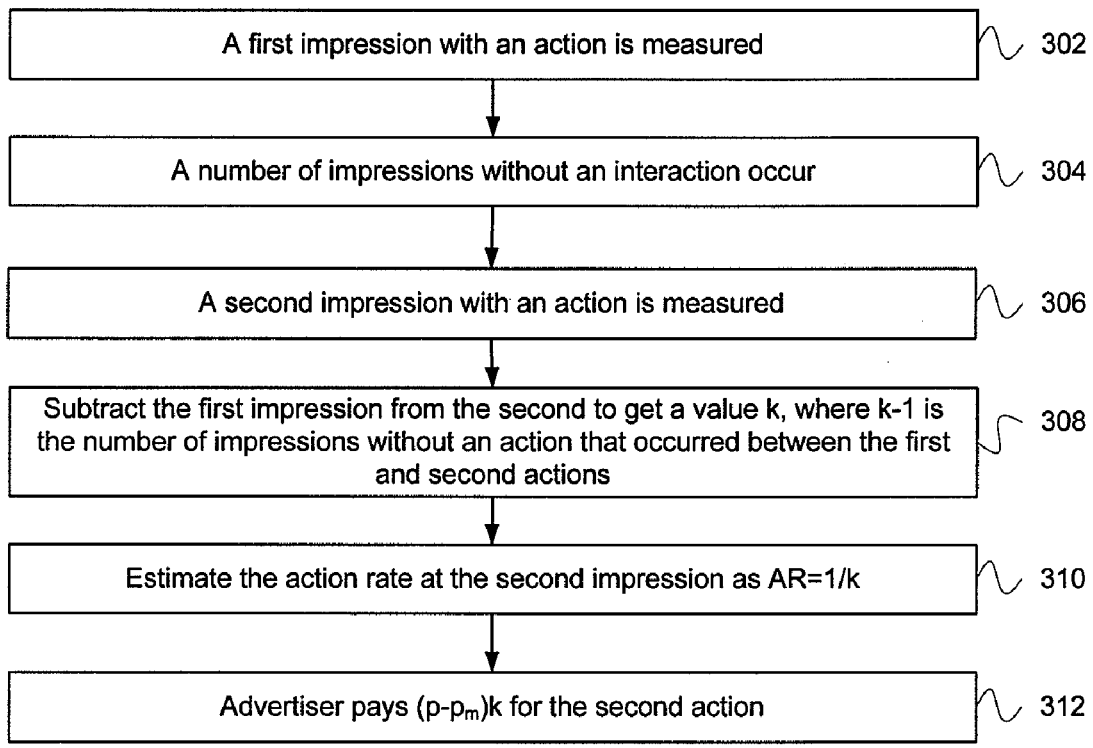
FIG. 3 is a flowchart depicting an embodiment of a payment process.

FIG. 3 illustrates one embodiment of a pay-per-action process. FIG. 3 may be an illustration of the calculation of the payment for an action as in step 218. In block 302, a first impression is recorded by the ad publisher 116 that results in an action. In particular, a user of the user device 102 views the page with the advertisement from the advertiser 120 and that impression results in an action recorded by the advertiser 120. Subsequently, a number of impressions are recorded in block 304 that do not result in an action. The ad publisher 116 records each impression for the advertisement. In block 306, a second impression is recorded (after the number of impressions recorded in block 304) that results in an action. As discussed above, the advertiser 120 reports the action from the first and second impressions to the ad publisher 116 who determines which impression led to the action.

The second impression may be defined as the k+1 impression, where k−1 is the number of impressions that took place between the first impression and the second impression. In other words, the first and second impressions both resulted in an action, but none of the k−1 impressions between them resulted in an action. In block 308, the value of k−1 is determined by subtracting the first impression from the second impression to get the value k. At the time of the second impression that led to an action, the action rate AR is estimated to be AR=1/k as in block 310. In other words, an action may occur approximately once every k impressions. The action rate may then be updated with each reported action based on the number of impressions between impressions resulting in actions. In one embodiment, the action rate may be one divided by the average number of impression $k_{AVE}$ between impressions resulting in actions. Alternatively, the total number of impressions resulting in actions may be divided into the total number of impressions between those impressions.

The payment from the advertiser 120 for each action may be determined as in block 312. In particular, the payment for the action that resulted from the second impression in block 306 may be $(p-p_m)k$. This payment amount may be reassigned to the impressions between the first and second impressions (including the second impression) by assigning an amount equal to $p-p_m$ to each of those impressions. In addition, each impression may be charged an amount equal to $p_m$, which was the payment for each impression. Accordingly, with this reassignment of charges, the cost corresponding to each impression will be p. In other words, on average an advertiser may be charged p per impression, regardless of how the advertisers report the actions (e.g., whether they report the actions truthfully, or they try to deceive the system).

Referring back to FIG. 2, the action rate may be updated each time an action is reported by the advertiser 120 as in step 220. In addition, the previous payments for actions may be recalculated as actions are reported. In the example of FIG. 3, assume that one of the k−1 impressions between the first and second impression was subsequently found to result in an action. The payment for the action for the second impression may then be recalculated to be based on the difference between the second impression and that impression that resulted in an action, rather than the difference between the first and second impressions. As a result, the action rate increases and the payment decreases because the k value in $(p-p_m)k$ has decreased.

The advertiser 120 may wish to edit its bid amount ba based on the revised action rate. In particular, as the action rate is increased, the bid amount used by the ad provider 116 may also increase because the advertisement slot may be allocated when $b_m + AR \times b_a \geq p$. Accordingly, as the advertiser 120 reports actions and has an increased action rate, it may decrease its bid amount $b_a$. Alternatively, if the advertiser 120 has a low action rate AR, then it may be necessary to increase the bid amount $b_a$ in order to be awarded an advertisement slot. This system rewards the advertisers with higher action rates by being more likely to be awarded advertisement slots and by paying less per action depending on the action rate (or the number of impressions between actions).

Figure 4:
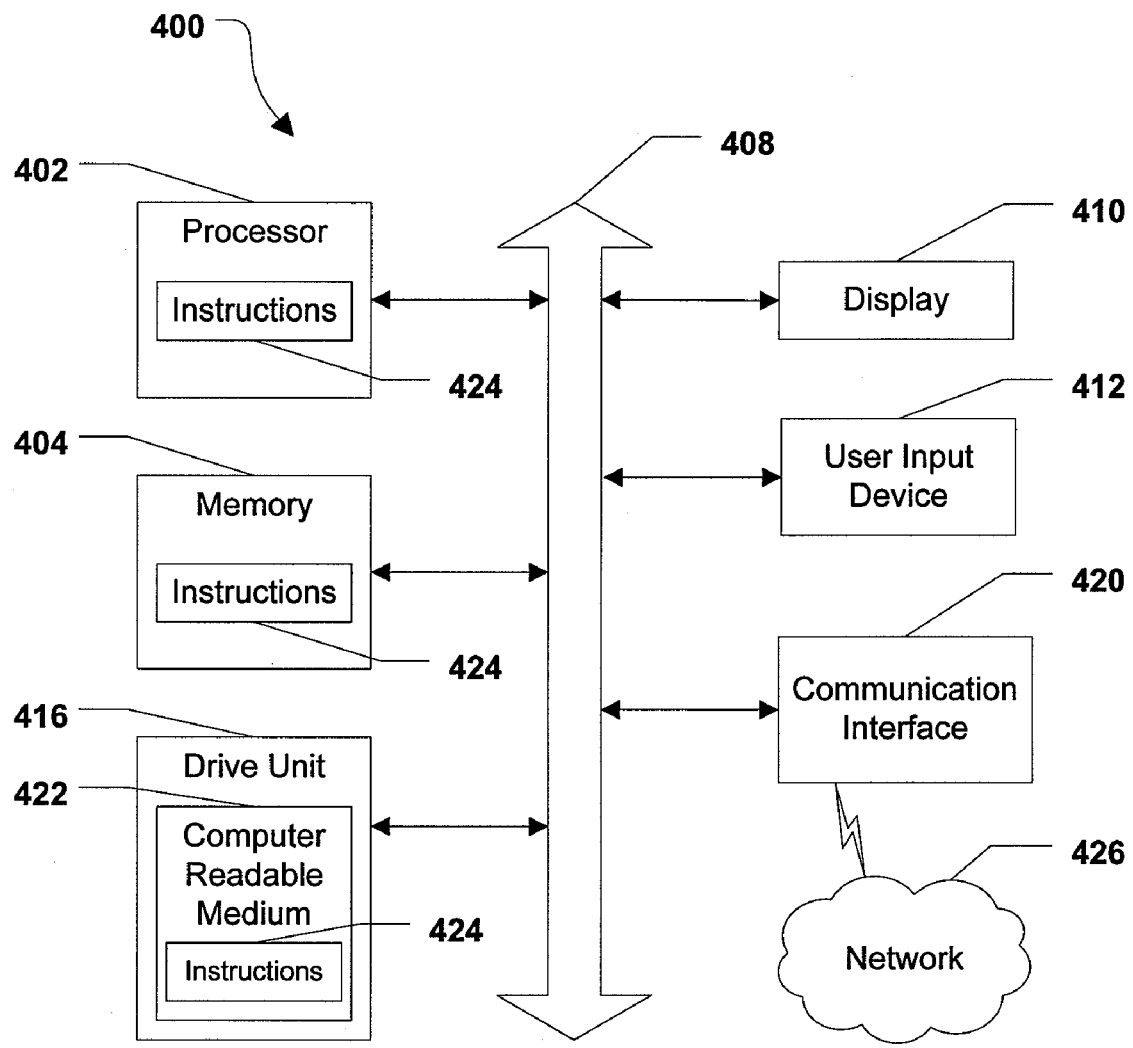
FIG. 4 is an illustration of a general computer system for use with the disclosed embodiments.

Referring to FIG. 4, an illustrative embodiment of a general computer system is shown and is designated 400. The web server 106, the web log database 104, the ad publisher server 112, the advertiser server 118, the ad publisher database 114, the user device 106, the web server operator 110, the ad publisher 116, and/or the advertiser 120 may be the computer system 400, or be any of the components described in the computer system 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication port 418. The communication port 418 may be a part of the processor 402 or may be a separate component. The communication port 418 may be created in software or may be a physical connection in hardware. The communication port 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computerized method for receiving a payment for displaying an advertisement comprising:
   receiving a request from an advertiser for an advertisement to be displayed, wherein the request includes a bid amount;
   calculating, with at least one processor, an action rate of actions per impressions, wherein the actions are taken after a click-through of the advertisement and the impressions are a number of times the advertisement is displayed; and determining, with the at least one processor, a payment to be paid by the advertiser, wherein a difference between a threshold bid and a price per impression is calculated and the determined payment comprises the calculated difference divided by the action rate.

2. The method of claim 1 wherein the payment to be paid by the advertiser further comprises the bid amount.

3. The method of claim 1 wherein the price per impression is the smaller of the bid amount and the threshold bid, wherein the threshold bid is one of a reserve price or a second highest bid amount.

4. The method of claim 1 wherein the action comprises a subsequent interaction with a displayed page after a click on the advertisement displays the page.

5. The method of claim 1 further comprising:
receiving an indication of a first action;
receiving an indication of a second action;
determining, with the at least one processor, a number of impressions between the first and second actions; and
calculating, with the at least one processor, the action rate as the inverse of the number of impressions between the first and second actions.

6. The method of claim 5 wherein the action rate is updated upon receiving each indication of a subsequent action, wherein each subsequent action is divided by the number of impressions preceding the subsequent action.

\* \* \* \* \*